United States Patent
Chan et al.

(10) Patent No.: US 8,135,911 B2
(45) Date of Patent: Mar. 13, 2012

(54) MANAGING A REGION CACHE

(75) Inventors: Uman Chan, Staten Island, NY (US);
Deryck X. Hong, Poughgkeepsie, NY (US); Tsai-Yang Jea, Poughkeepsie, NY (US); Hanhong Xue, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/255,180

(22) Filed: Oct. 21, 2008

(65) Prior Publication Data
US 2010/0100674 A1    Apr. 22, 2010

(51) Int. Cl.
*G06F 12/02* (2006.01)
(52) U.S. Cl. .................. 711/118; 711/E12.041
(58) Field of Classification Search ............... None
See application file for complete search history.

(56) References Cited

U.S. PATENT DOCUMENTS

| | | | |
|---|---|---|---|
| 5,794,243 A * | 8/1998 | Alexander et al. ............ 711/118 |
| 6,157,981 A | 12/2000 | Blaner et al. |
| 6,490,657 B1 | 12/2002 | Masubuchi et al. |
| 6,564,297 B1 | 5/2003 | Kosche |
| 6,711,562 B1 * | 3/2004 | Ross et al. .................... 707/741 |
| 6,772,179 B2 * | 8/2004 | Chen et al. ............. 711/E12.057 |
| 6,772,299 B2 | 8/2004 | McWilliams et al. |
| 7,246,202 B2 | 7/2007 | Morishita et al. |
| 2003/0028728 A1 | 2/2003 | Ito |
| 2003/0126116 A1 * | 7/2003 | Chen et al. ....................... 707/3 |
| 2004/0193801 A1 | 9/2004 | Benhase et al. |
| 2004/0258314 A1 | 12/2004 | Hashimoto |
| 2005/0144168 A1 * | 6/2005 | Kurokawa et al. ................ 707/7 |
| 2005/0257008 A1 | 11/2005 | Nakajima et al. |
| 2006/0095660 A1 * | 5/2006 | Ito et al. ......................... 711/113 |
| 2006/0143256 A1 | 6/2006 | Galchev et al. |
| 2007/0006047 A1 * | 1/2007 | Zhou et al. ....................... 714/38 |
| 2007/0066047 A1 | 3/2007 | Ye et al. |
| 2007/0233962 A1 * | 10/2007 | Piry et al. ....................... 711/128 |
| 2008/0313420 A1 * | 12/2008 | Beckmann et al. ............ 711/207 |

OTHER PUBLICATIONS

Michael J. Geiger, Sally A. McKee, and Gary S. Tyson. 2005. Drowsy region-based caches: minimizing both dynamic and static power dissipation. In Proceedings of the 2nd conference on Computing frontiers (CF '05). ACM, New York, NY, USA, 378-384. DOI=10.1145/1062261.1062322 <http://doi.acm.org/10.1145/1062261.1062322>.*

Bhooshan S. Thakar. 2001. Access Region Cache: A Multi-Porting Solution for Future Wide-Issue Processors. In Proceedings of the International Conference on Computer Design: VLSI in Computers \& Processors (ICCD '01). IEEE Computer Society, Washington, DC, USA, 293-.*

(Continued)

*Primary Examiner* — Pierre-Michel Bataille
*Assistant Examiner* — Ralph A Verderamo, III
(74) *Attorney, Agent, or Firm* — Stephen Bongini; Fleit Gibbons Gutman Bongini & Bianco PL

(57) ABSTRACT

A method, system, and computer program product are provided for managing a cache. A region to be stored within the cache is received. The cache includes multiple regions and each of the regions is defined by memory ranges having a starting index and an ending index. The region that has been received is stored in the cache in accordance with a cache invariant. The cache invariant guarantees that at any given point in time the regions in the cache are stored in a given order and none of the regions are completely contained within any other of the regions.

20 Claims, 7 Drawing Sheets

OTHER PUBLICATIONS

Thakar, et al., "Access Region Cache: A Multi-Porting Solution for Future Wide-Issue Processors," 0-7695-1200-3/01; 2001 IEEE; pp. 293-300.

Geiger, et al., "Drowsy Region-Based Caches: Minimizing Both Dynamic and Static Power Dissipation," CF '05, May 4-6,2005, Ischia, Italy; Copyright 2005 ACM 1-59593-018-3/05/0005.

* cited by examiner

MANAGING A REGION CACHE

FIELD OF THE INVENTION

The present invention generally relates to the field of information processing systems, and more particularly relates to systems and methods for managing the cache memory of an information processing system.

BACKGROUND OF THE INVENTION

Many computing environments today utilize multiple processors. These processors often contain a small amount of dedicated memory, which is known as a cache. Caches are used to increase the speed of operation. One type of cache is a region cache. A region cache includes one or more regions that are defined by a starting index and an ending index. One problem with current region caches is that they are not managed in the most efficient manner. For example, a typical current region cache management mechanism allows for regions to be entirely contained within other regions, or does not sort the regions in a meaningful way. This greatly reduces resource usage efficiency.

SUMMARY OF THE INVENTION

One embodiment of the present invention provides a method for managing a cache. According to the method, there is received a region to be stored within the cache. The cache includes multiple regions and each of the regions is defined by memory ranges having a starting index and an ending index. The region that has been received is stored in the cache in accordance with a cache invariant. The cache invariant guarantees that at any given point in time the regions in the cache are stored in a given order and none of the regions are completely contained within any other of the regions.

In another embodiment, an information processing system for managing a cache is disclosed. The information processing system includes a memory and a processor that is communicatively coupled to the memory. The information processing system also includes a region cache manager that is communicatively coupled to the memory and the processor. The region cache manager is adapted to receive a region to be stored within the cache. The cache includes multiple regions and each of the regions is defined by memory ranges having a starting index and an ending index. The region that has been received is stored in the cache in accordance with a cache invariant. The cache invariant guarantees that at any given point in time the regions in the cache are stored in a given order and none of the regions are completely contained within any other of the regions.

In yet another embodiment, a computer program product for managing a cache is disclosed. The computer program product includes instructions for receiving a region to be stored within the cache. The cache includes multiple regions and each of the regions is defined by memory ranges having a starting index and an ending index. The region that has been received is stored in the cache in accordance with a cache invariant. The cache invariant guarantees that at any given point in time the regions in the cache are stored in a given order and none of the regions are completely contained within any other of the regions.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION

Embodiments of the present invention allow regions to be efficiently cached within a region cache. Operations such as insertion, deletion, lookup, and replacement can be done in O(log n) efficiency, where n is the number of regions in the cache. In one embodiment, sorting is performed when a region is inserted into the region cache to increase lookup performance, and overlapping regions contained by other regions can be combined to reduce resource usage, while keeping frequently used regions in cache due to active usage. Also, embodiments of the present invention allow a lazy-kick out mechanism to be used for taking advantage of temporal and spatial locality of region usage.

Operating Environment

Figure 1:
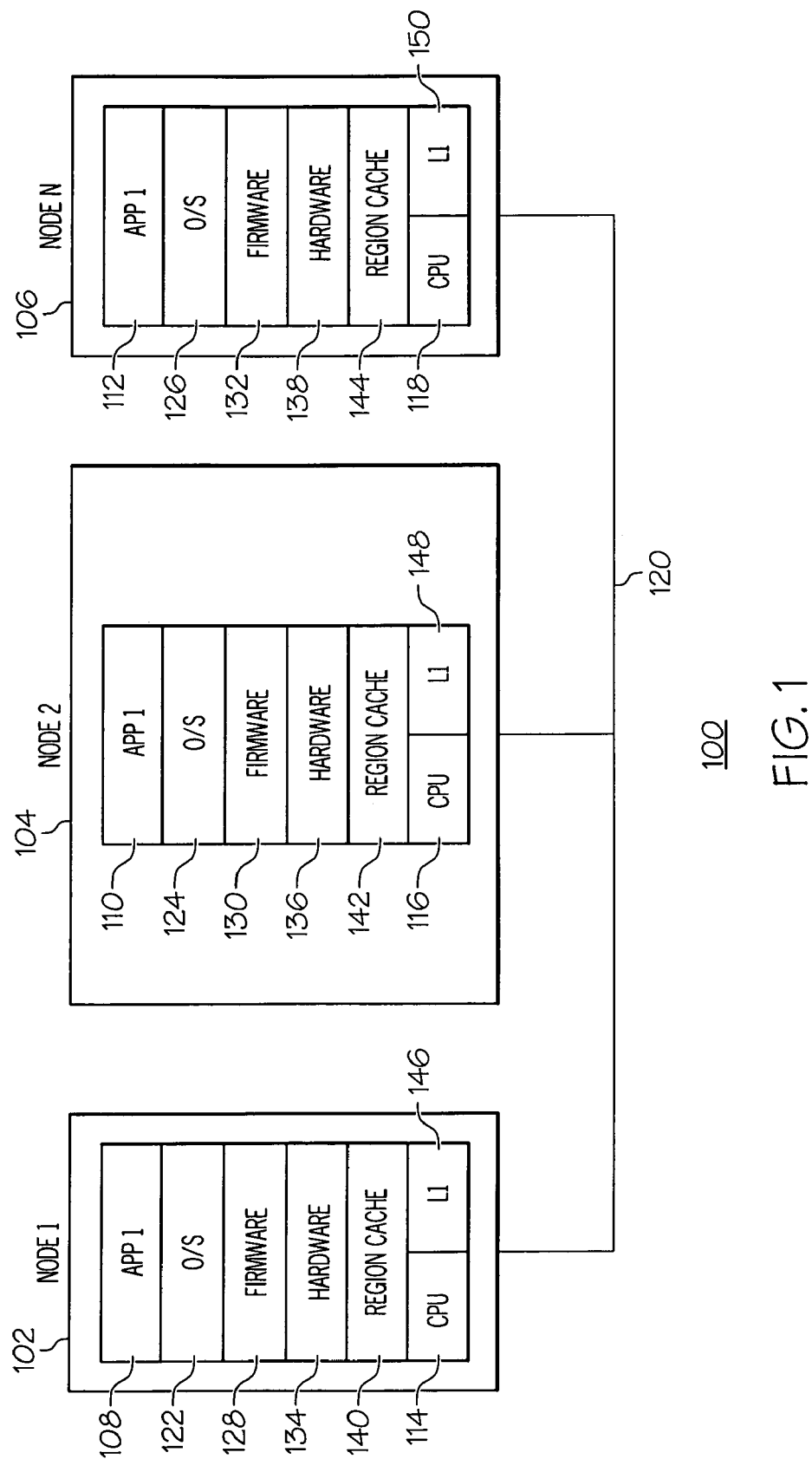
FIG. 1 is a block diagram illustrating an operating environment in accordance with one embodiment of the present invention.

FIG. 1 is a block diagram illustrating an operating environment according to one embodiment of the present invention. The operating environment 100 includes a number of processing nodes 102, 104, and 106. In this embodiment, the operating environment 100 is a distributed computing environment. However, the present invention is also applicable to non-distributed computing environments, single node environments, and single processor environments. In the illustrated embodiment, application programs APP_1 108, APP_2 110, and APP_N 112 are running on the respective processors 114, 116, and 118 of the processing node 102, 104, and 106.

In another embodiment, the application programs APP_1 108, APP_2 110, and APP_N 112 are distributed and running on more than one processor, either within one processing node or across the processing nodes. An application program interface ("API") can be used to interface the applications 108, 110, and 11 2 with other processing nodes on the network switch 120 that couples the nodes.

Each processing node 102, 104, and 106 includes an operating system 122, 124, and 126 that is running on its processor 114, 116, and 118. The operating system 122, 124, and 126 provides, among other things, a software platform on top of which the applications APP_1 108, APP_2 110, and APP_N 112 are executed. Each processing node 102, 104, and 106 also includes firmware 128, 130, and 132 that provides instructions for allowing its processor 114, 116, and 118 to communicate with other hardware components. A communication subsystem 202 (FIG. 2) includes, among other things, at least one region cache 140, 142, and 144. Traditional caches such as an L1 (Level 1) cache 146, 148, and 150 are included within the memory-subsystem 204 (FIG. 2) of each processing node 102, 104, and 106.

Region Cache

Figure 2:
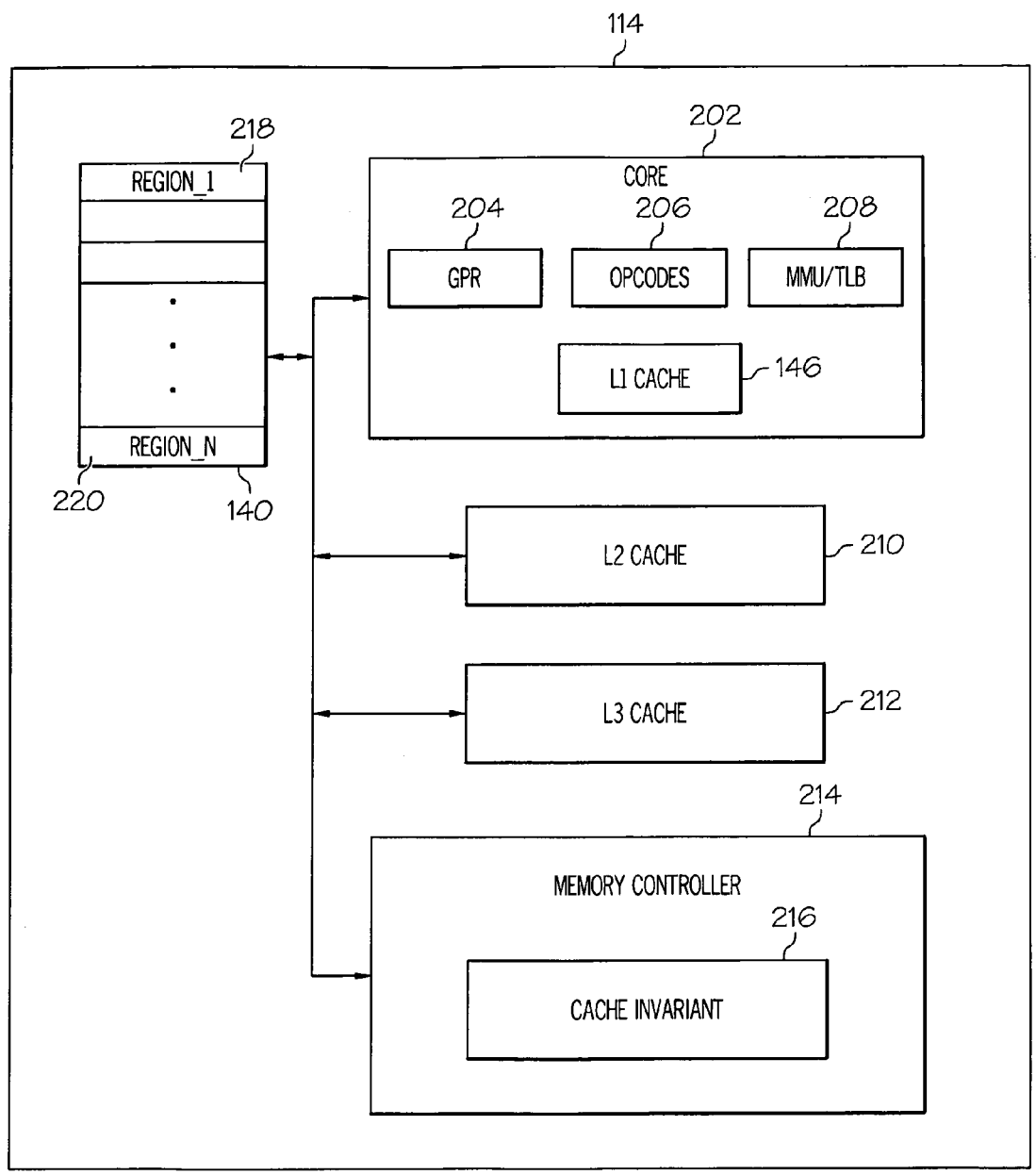
FIG. 2 is a block diagram illustrating a simplified view of a processor according to one embodiment of the present invention.

FIG. 2 is a block diagram illustrating a more detailed view of a communication subsystem 202 of a processing node 102 according to one embodiment of the present invention. The communication subsystem 202 includes a region cache 140 in this embodiment. A region cache manager 206 is also coupled to the process core 122 and includes a cache invariant 212.

FIG. 2 shows the region cache 140, which has multiple entries 218 and 220, which include information about currently registered memory. These entries allow applications to efficiently lookup registered memory areas. A region cache 140 can be defined by a collection of any number of regions. Each region 218 and 220 is defined by memory ranges marked by starting and ending indices. The starting and ending indices can be of any nature as long as the indices can be sorted in some order. At any given time, there can be zero or any positive number of regions in the region cache 140. The term "cache" implies that regions 218 and 220 within the region cache 140 are persistent for some period of time (e.g., until a region is removed from the cache), and regions are maintained in the cache for reusability.

In one embodiment, the region cache 140 supports interconnect adapters (e.g., InfiniBand connectors) that have the capability of DMA (Direct Memory Access). For example, these adapters work on memory regions and maintain a mapping from virtual memory regions to physical pages. The mapping is explicitly requested through a registration process such as a heavyweight registration process that is initiated by the software. Therefore, the region cache 140 cache is maintained by software/hardware that includes registered memory regions.

Embodiments of the present invention allow regions to be cached in an efficient manner. Operations such as insertion, deletion, lookup, and replacement can be done in O(log n) efficiency, where n is the number of regions in the region cache 140. Traditionally, caching is commonly used in improving computing efficiency. The region cache model of the present invention can be used in solving various computing resource problems and improving resource usage efficiency. This region caching model can be used in any dimensional space. For the sake of simplicity, the following description relates to a one dimensional space. However, this is only one example and the present invention is not so limited.

In one embodiment, an application issues a data transfer request on a memory region where effective addressing is used. The communication subsystem 202 receives this request and looks up the region in the region cache 140, via a region cache manager 206, to determine if the memory region is already registered.

If the region cache 140 includes information that indicates the memory region is already registered, then a previously registered region handle is passed to the interconnect adapter 208 for the data transfer request. Otherwise, a registration process 214 such as a heavyweight registration process is performed to place the region into a region translation table 210, which translates the effective address of the memory region into a real address. A returned region handle is then passed to the interconnect adapter 208 for the data transfer request. The interconnect adapter 208 then uses the region handle to look up the real address of the memory region in the region translation table 210 and issues a DMA to transfer data in the specified memory region.

The region cache manager 206 is able to perform and manage multiple operations on the region cache 140. For example, the region cache manager 206 can perform a region cache lookup operation. A region cache lookup operation locates a region 218 in the cache 140 that entirely contains the region of interest (input). If such a region is found, the result is a cache hit. Otherwise, the result is a cache miss.

A region cache insertion operation places a region of interest (input) into the region cache. A region cache replacement operation places a region of interest (input) into the region cache, while removing one or more existing regions in the cache that occupy the same space as the input region. A region removal operation removes a region from the region cache. A region coalesce operation combines existing, overlapping regions in the cache to form a new region that covers the space previously occupied by the overlapping regions.

In this embodiment, any change in state of the region cache 140 is carried out by an atomic operation. The region cache manager 206 performs one or more operations in accordance with a cache invariant 212. Before and after each operation, the region cache manager 206 ensures that the following cache invariant 212 holds true: at any point in time, the regions in the region cache are stored in some order and no region is completely contained within any other region.

Figure 3:
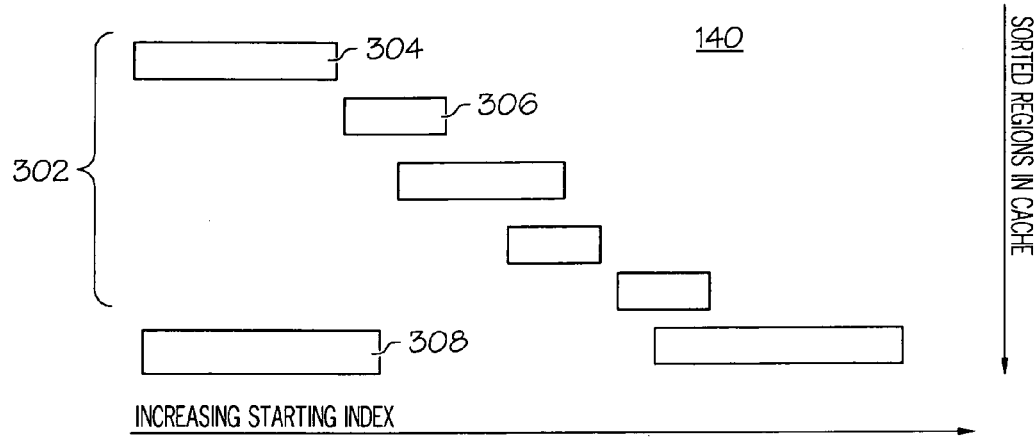
FIG. 3 is a logical view of a region cache that is governed by a cache invariant in a one dimensional space according to one embodiment of the present invention.

For example, FIG. 3 is a logical view of a region cache 140 that is governed by the cache invariant 212 in a one dimensional space in accordance with one embodiment of the present invention. As shown, there is a set of regions 302 sorted by increasing starting address, with each region in the set of regions 302 being associated with a starting address and an ending address. Also, there is no region entirely enclosed by another region. For example, the second region 306 is at least partly outside of the first region 304. In this example, each starting address and ending address of a region is greater than those of a preceding region.

When the region cache manager 206 is to perform an operation requiring a lookup of the region cache 140, the region cache manager 206 performs a binary search for this operation. In this embodiment, the binary search does not search for an exact match, but returns results based on a criteria and an assumption of state that is guaranteed by the cache invariant. The binary search takes an index of the region to be inserted as input, and returns a position.

More specifically, in this one dimensional case, the regions are sorted by the starting index in increasing order in the cache 140, and the binary search returns the position of the region whose starting index is greatest but smaller than the starting index of the region to be looked up/inserted. In an embodiment where the binary search is on the ending index of the region to be looked up/inserted, the binary search returns the region whose index is smallest but greater than the ending index of the region to be looked up/inserted. Because the region cache manager 206 ensures that the cache invariant 212 holds true, the cache 140 is guaranteed to be free of regions that are entirely contained within another region.

Therefore, the simple binary search criteria always return positives results, even though an exact match is not always returned.

The region cache manager 206 performs various operations on the region cache 140 such as (but not limited to) cache lookup, cache replacement, cache removal, cache insertion, and cache coalescing. When the region cache manager 206 performs any of these or other operations, the controller 206 ensures that the cache invariant 212 is satisfied. Therefore, with respect to a cache lookup operation, because the cache invariant 212 is guaranteed, a single lookup using the binary search described above yields the region of interest. The region cache manager 206 determines whether a cache hit or miss has occurred by performing a simple check on the indices of the requested region against the indices of the region returned by the binary search. This determination allows the region cache manager 206 to determine whether the requested region is contained or not.

When a cache lookup is requested by an application to locate a computing resource stored as a region in the cache 140, the region cache manager 206 performs the lookup operation. If the result is a cache hit, then the requested resource has been found. If the result is a cache miss, the application is able to allocate one or more resources and store this resource into the cache 140 as a region. This causes subsequent lookups to result in a cache hit. The storing of the allocated resource or updating of the resource is performed using an insertion operation.

With respect to a cache insertion operation, the region cache manager 206 also ensures that the cache invariant 212 is satisfied. As discussed above, each region in the cache 140 includes a set of indices which marks the beginning and end of the region. When the controller 216 receives a request to insert a (new) region into the cache, the controller 216 performs a binary search to find the position of insertion. The position of insertion is determined by the value of one of the indices of the region, depending on which index the cache is sorted by (i.e., the starting index or the ending index). This is the first marked position.

After a position for insertion is determined, a second binary search is performed on the other index of the (new) region to determine the last region in the cache that is contained within the (new) region. This is the second marked position. The (new) region is then inserted into the cache 140, while all the regions from the first to the second marked position are removed from the cache. Since this scan is performed only on a limited subset of regions in the cache 140, a sequential scan can be done from the first marked position to achieve the same result without a second binary search. Optionally, regions that intersect with the new region can be coalesced with the new region to form a larger region (while the regions added to form the larger region are removed).

Figure 4:
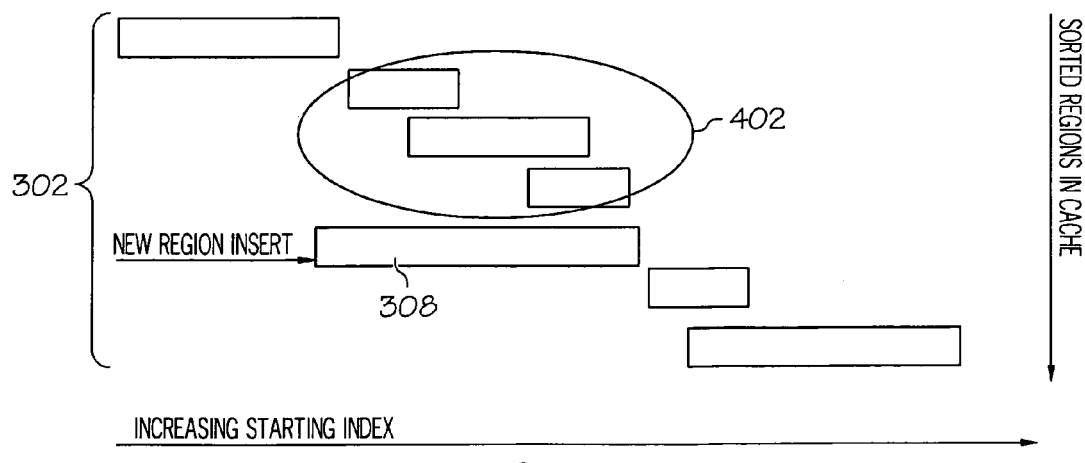
FIG. 4 illustrates an example of inserting a new region into the region cache of FIG. 3 according to one embodiment of the present invention.

As an example, FIG. 3 shows a region 308 that is to be inserted into the region cache 140. FIG. 4 shows an example of inserting the region 308 into the region cache 140. The region cache manager 206, in the example of FIG. 4, has determined the position of insertion in the manner discussed above and that a set of regions 402 is to be entirely contained within the new region 308 being inserted. Therefore, in this example, the set of regions 402 are combined and removed so that the cache invariant 212 is satisfied.

If the region cache manager 206 is to perform a cache replacement operation, the region cache manager 206 carries out this operation using an insertion operation. Once the insertion position is determined (e.g., in the manner discussed above), any duplicate regions and any regions that are enclosed by the replacement region are "combined" with the replacement region, and then removed from the region cache 140. With respect to a cache removal operation, the region cache manager 206, in this embodiment, utilizes a lazy kick-out mechanism to further increase system performance. A lazy kick-out mechanism delays the actual removal of region(s) by placing the region(s) in a temporary space such that the region(s) can no longer be used. Actual cleanup of the region(s) is performed at a later time to help optimize computing resource scheduling.

When the region cache manager 206 performs a cache coalescing operation, the controller 206 identifies overlapping and touching regions. These regions are combined by finding overlapping and touching regions in the cache and inserting a new region covering the same space previously occupied by those regions. The controller then removes the combined regions from the cache 140. This reduces the number of regions used, and helps with reducing resource usage in cases where each region represents a form of computing resource.

Process Flow For Lookup Operation

Figure 5:
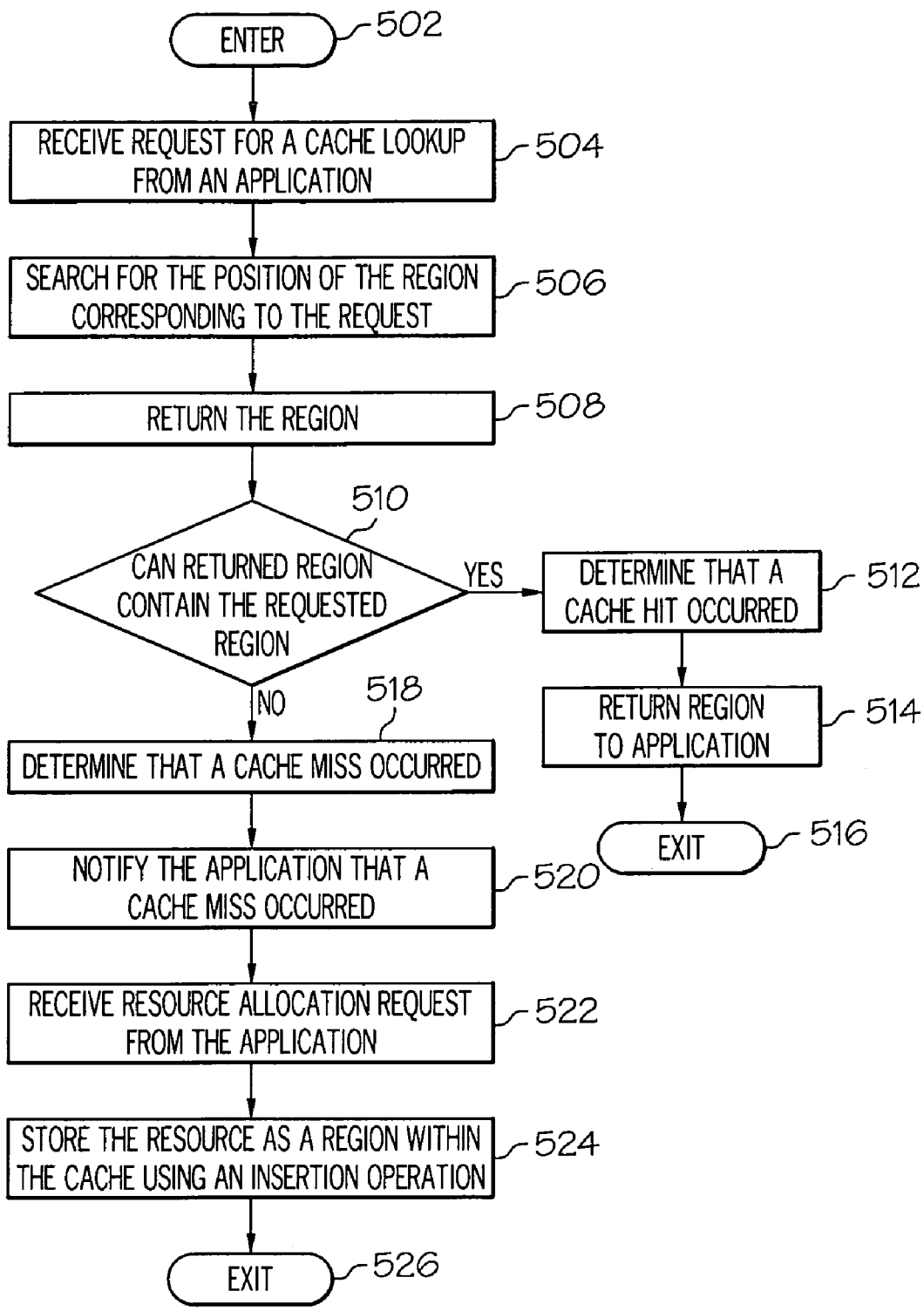
FIG. 5 is an operational flow diagram illustrating a process for performing a cache lookup operation in accordance with a cache invariant according to one embodiment of the present invention.

FIG. 5 is an operational flow diagram illustrating a process for performing a lookup operation in accordance with the cache invariant according to one embodiment of the present invention. The operational flow begins at step 502 and flows directly to step 504. The region cache manager 206, at step 504, receives a request for a cache lookup from an application 108. In this example, the regions in the cache 140 are sorted by the starting index of each region, as shown in the examples of FIGS. 3 and 4.

The region cache manager 206, at step 506, searches the cache 140 for the position of the region corresponding to the request using a binary search, as explained above. At step 508, the region is returned. Because the cache invariant 212 is guaranteed, a single lookup using the binary search described above yields the region of interest. Also, because the regions are sorted by starting index, the search returns the position of the region with a starting index that is closest to the starting index of the request, but still smaller than the starting index of the request.

The region cache manager 206, at step 510, determines if the returned region can contain the requested region. If the result of this determination is positive, the region cache manager 206, at step 512, determines that a cache hit occurred, and, at step 514, returns the region in cache 140 to the application. The control flow then exits at step 516. If the region cache manager 206 determines that the request region cannot be contained, then the region cache manager 206, at step 518, determines that a cache miss has occurred. The region cache manager 206, at step 520, then notifies the application 108 of the cache miss. Next, the region cache manager 206, at step 522, receives an allocation request from the application 108. The region cache manager 206, at step 524, stores this resource into the cache 140 as a region using the insertion operation described above. The control flow then exits at step 526.

Process Flow For Insertion Operation

Figure 6:
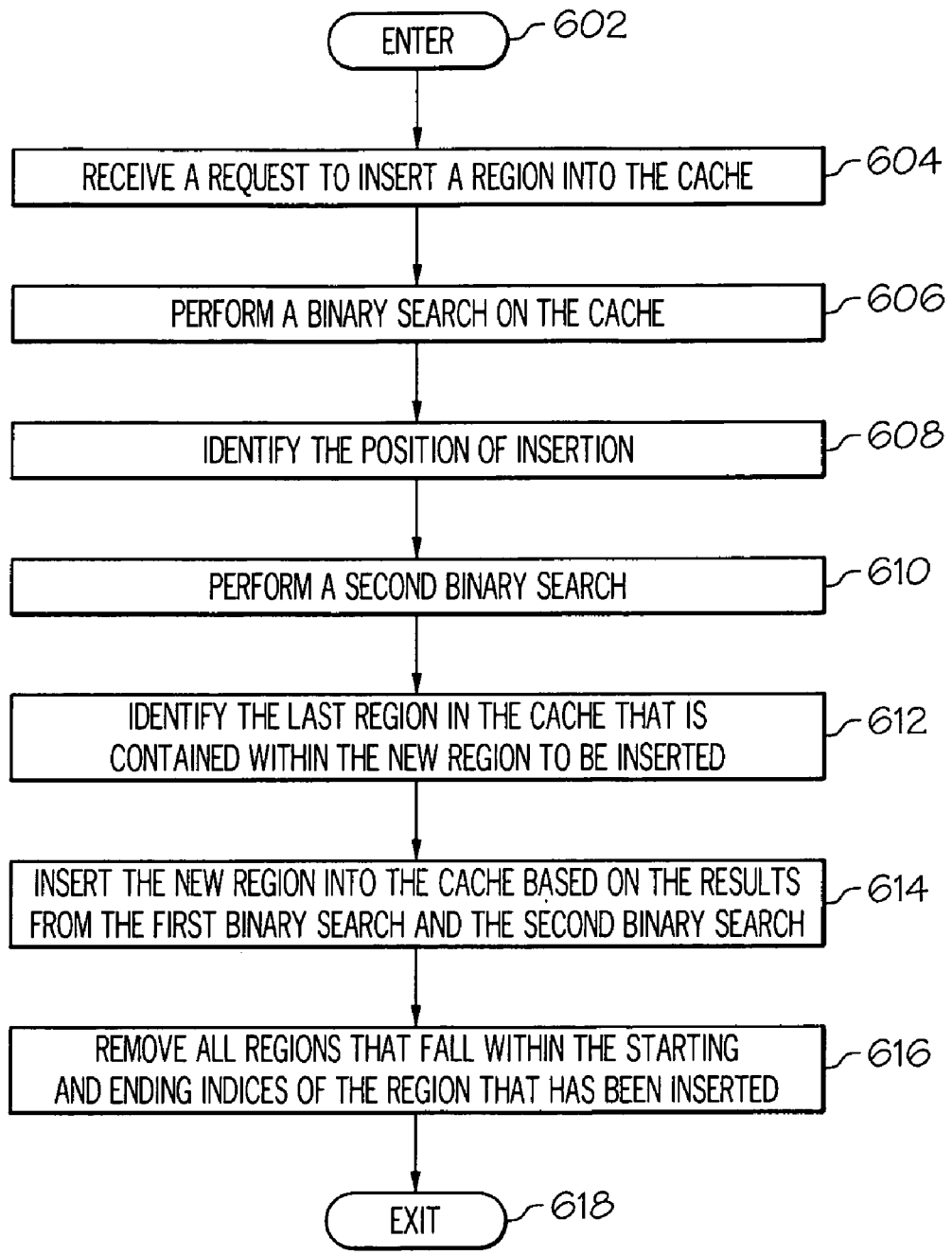
FIG. 6 is an operational flow diagram illustrating a process for performing a cache insertion operation in accordance with a cache invariant according to one embodiment of the present invention.

FIG. 6 is an operational flow diagram illustrating a process for performing an insertion operation in accordance with the cache invariant according to one embodiment of the present invention. The operational flow begins at step 602 and flows directly to step 604. The region cache manager 206, at step 604, receives a request to insert a region into the cache 140, and determines that an insertion operation needs to be performed. The region cache manager 206, at step 606, performs a binary search to find the position of insertion. In this example, the regions are sorted by starting index.

The region cache manager 206, at step 608, identifies the position of insertion. This position is determined by the value of one of the indices of the region, depending on the index by which the cache is sorted (i.e., the starting index or the ending index). This is the first marked position. In this example, the search returns the position of a region in the cache 140 with a starting index whose starting index is greatest, but still smaller than the starting index of the region requested to be inserted.

The region cache manager 206, at step 610, performs a second binary search on the other index of the (new) region. The region cache manager 206, at step 612, determines the last region in the cache that is contained within the (new) region. This is the second marked position. In this example, the region returned has an ending index that is the smallest, but is still larger than the region requested to be inserted. The region cache manager 206, at step 614, inserts the (new) region into the cache 140 based on the results form the first and second binary searches. The region cache manager 206, at step 616, removes all of the regions between the first to the second marked position (i.e., those that fall within the starting and ending indices of the (new) region. The control flow then exits at step 618.

Process Flow For Removal Operation

Figure 7:
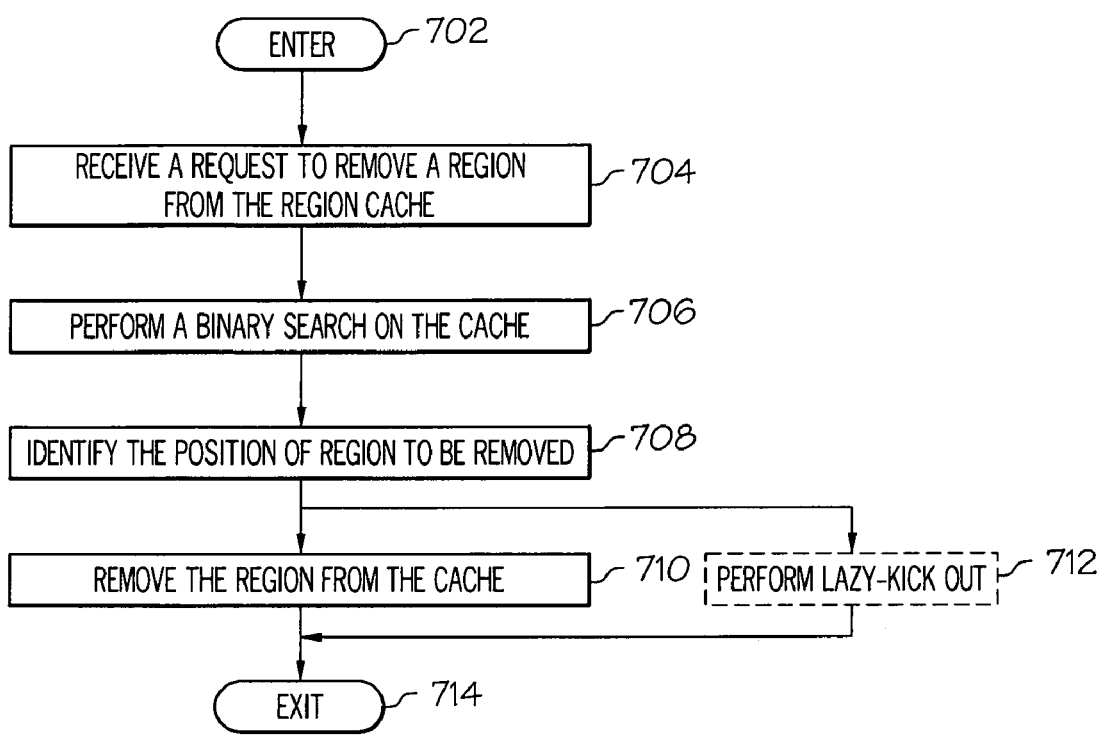
FIG. 7 is an operational flow diagram illustrating a process for performing a region removal operation in accordance with a cache invariant according to one embodiment of the present invention.

FIG. 7 is an operational flow diagram illustrating a process for performing a removal operation in accordance with the cache invariant according to one embodiment of the present invention. The operational flow begins at step 702 and flows directly to step 704. The region cache manager 206, at step 704, receives from an application 108 a request for removing a region from the cache 140. In this example, the regions in the cache 140 are sorted by the starting index of each region, as shown in the examples of FIGS. 3 and 4.

The region cache manager 206, at step 706, performs a binary search to identify the starting and ending index of the region to be removed. In this example, the search returns the position of the region with a starting index that is closest to the starting index of the region requested to be removed, but still smaller than the region requested to be removed. The region cache manager 206, at step 708, identifies the position of the region to be removed. The region cache manager 206, at step 710, removes the region. Alternatively, instead of removing the region, the region cache manager, at step 712, can utilize a lazy kick-out that delays the actual removal of the region by placing the region in a temporary space such that the region can no longer be used. The control flow then exits at step 714.

Information Processing System

Figure 8:
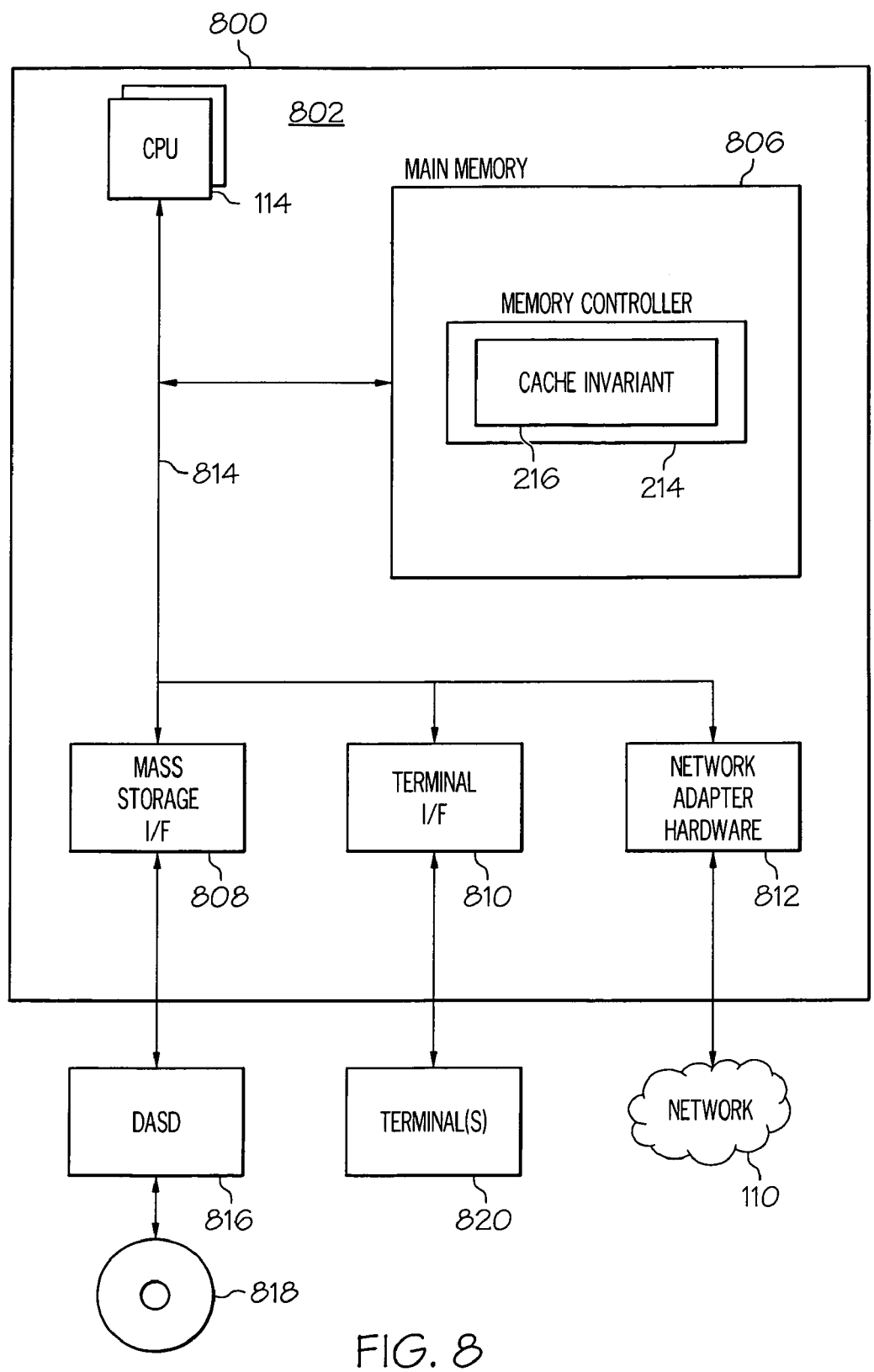
FIG. 8 is a block diagram illustrating an information processing system in accordance with one embodiment of the present invention.

FIG. 8 is a block diagram illustrating an information processing system 800 that is useful for implementing embodiments of the present invention. The information processing system 800 is a suitably configured processing system adapted to implement an embodiment of the present invention. Any suitably configured processing system is able to be used in embodiments of the present invention, such as a personal computer, workstation, or the like.

The illustrated information processing system 800 includes a computer 802. The computer 802 has a processor 114 that is connected to a main memory 806, a mass storage interface 808, a terminal interface 810, and network adapter hardware 812. A system bus 814 interconnects these system components. The mass storage interface 808 is used to connect mass storage devices, such as data storage device 816, to the information processing system 800. One specific type of data storage device is a disk drive that can store data to and read data from a computer readable medium, such as an optical disk 818 or a magnetic disk.

The main memory 806, in this embodiment, includes a region cache manager 206 and a cache invariant 212. Although illustrated as concurrently resident in the main memory 806, components are not required to be completely resident in the main memory 806 at all times or even at the same time. In this embodiment, the information processing system 800 utilizes conventional virtual addressing mechanisms to allow programs to behave as if they have access to a large, single storage entity, referred to as computer system memory, instead of access to multiple, smaller storage entities such as the main memory 806 and data storage device 816. The term "computer system memory" thus generically refers to the entire virtual memory of the information processing system 800.

Although only one CPU 804 is illustrated for computer 802, computer systems with multiple CPUs can be used equally effectively. This embodiment of the present invention further incorporates interfaces that each includes separate, fully programmed microprocessors that are used to off-load processing from the CPU 804. Terminal interface 810 is used to directly connect one or more terminals 820 to computer 802 to provide a user interface to the computer 802. These terminals 820, which are able to be non-intelligent or fully programmable workstations, are used to allow system administrators and users to communicate with the information processing system 800. The terminal 820 is also able to be a user interface and peripheral devices that are connected to computer 802 and controlled by terminal interface hardware included in the terminal interface 810 that includes video adapters and interfaces for keyboards, pointing devices, and the like.

An operating system is included in the main memory, and is preferably a suitable multitasking operating system. However, further embodiments of the present invention use any other suitable operating system. Some embodiments of the present invention utilize an architecture, such as an object oriented framework mechanism, that allows instructions of the components of operating system to be executed on any processor located within the information processing system 800. The network adapter hardware 812 is used to provide an interface to a network 110. Embodiments of the present invention are able to be adapted to work with any data communications connections including present day analog and/or digital techniques or via a future networking mechanism.

Although this exemplary embodiment of the present invention is described in the context of a fully functional computer system, further embodiments are capable of being distributed as a program product via a tangible computer readable medium (such as a CD, DVD, diskette, flash memory device, or other form of recordable media), or via any type of electronic transmission mechanism.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, one embodiment of the present invention may not include all of the features described above. Therefore, it is intended that the present invention not be limited to the particular embodiments disclosed, but that the invention include all embodiments falling within the scope of the appended claims.

What is claimed is:

1. A method for managing a cache, the method comprising the steps of:
    receiving a region to be stored within the cache, the cache comprising a plurality of regions, and each of the regions being defined by memory ranges having a starting index and an ending index; and
    storing, by a processor, the region that has been received in the cache in accordance with a cache invariant, the cache invariant guaranteeing that at any given point in time the regions in the cache are stored in a given order and none of the regions are completely contained within any other of the regions,
    wherein the storing comprises storing the region that has been received in the cache based on an index value of an immediately preceding region in the cache and based on an index value of an immediately following region in the cache.

2. The method of claim 1, wherein the given order is an increasing order based on the starting index of each of the regions.

3. The method of claim 1, wherein the storing further comprises storing the region that has been received such that a value of a first index associated with the region that has been received is greater than a value of a first index associated with the immediately preceding region in the cache and such that a value of a second index associated with the region that has been received is smaller than a value of a second index associated with the immediately following region in the cache.

4. The method of claim 1, further comprising the steps of:
    receiving a request for an operation to be performed on the cache; and
    performing a binary search based on a criteria and an assumption of cache state that is guaranteed by the cache invariant.

5. The method of claim 1, further comprising the steps of:
    receiving a request for a region to be inserted into the cache;
    performing a first binary search on the cache;
    after performing the first binary search, determining a position of insertion into the cache based on a value of a first index associated with the region to be inserted;
    performing a second binary search on the cache;
    after performing the second binary search, determining a last region in the cache that is contained within the region to be inserted based on a value of a second index associated with the region to be inserted;
    inserting the region to be inserted into the cache at the position of insertion; and
    removing all of the regions in the cache between the value of the first index associated with the region and the last region.

6. The method of claim 1, further comprising the steps of:
    determining that at least a first region in the cache partially overlaps with a second of the regions in the cache; and
    combining the first region with the second region so as to create a single region in the cache.

7. The method of claim 1, further comprising the steps of:
    receiving a request for a region to be removed from the cache;
    performing a binary search on the cache;
    after performing the binary search, identifying a first index and a second index of a region; and
    removing the region from the cache based on the first index and the second index of the region.

8. An information processing system for managing a cache, the information processing system comprising:
    a memory;
    a processor communicatively coupled to the memory; and
    a region cache manager communicatively coupled to the memory and the processor,
    wherein the region cache manager is configured to:
        receive a region to be stored within the cache, the cache comprising a plurality of regions, and each of the regions being defined by memory ranges having a starting index and an ending index; and
        store the region that has been received in the cache in accordance with a cache invariant, the cache invariant guaranteeing that at any given point in time the regions in the cache are stored in a given order and none of the regions are completely contained within any other of the regions, the storing of the region that has been received comprising storing the region that has been received in the cache based on an index value of an immediately preceding region in the cache and based on an index value of an immediately following region in the cache.

9. The information processing system of claim 8, wherein the given order is an increasing order based on the starting index of each of the regions.

10. The information processing system of claim 8, wherein the storing of the region that has been received further comprises storing the region that has been received such that a value of a first index associated with the region that has been received is greater than a value of a first index associated with the immediately preceding region in the cache and such that a value of a second index associated with the region that has been received is smaller than a value of a second index associated with the immediately following region in the cache.

11. The information processing system of claim 8, wherein the region cache manager is further configured to:
    receive a request for an operation to be performed on the cache; and
    perform a binary search based on a criteria and an assumption of cache state that is guaranteed by the cache invariant.

12. The information processing system of claim 8, wherein the region cache manager is further configured to:
    receive a request for a region to be inserted into the cache;
    perform a first binary search on the cache;
    after the first binary search is performed, determining a position of insertion into the cache based on a value of a first index associated with the region to be inserted;
    perform a second binary search on the cache;
    after the second binary search is performed, determining a last region in the cache that is contained within the region to be inserted based on a value of a second index associated with the region to be inserted;
    insert the region to be inserted into the cache at the position of insertion; and
    remove all of the regions in the cache between the value of the first index associated with the region and the last region.

13. The information processing system of claim 8, wherein the region cache manager is further configured to:
    determine that at least a first region in the cache partially overlaps with a second of the regions in the cache; and
    combine the first region with the second region so as to create a single region in the cache.

14. The information processing system of claim 8, wherein the region cache manager is further configured to:
    receive a request for a region to be removed from the cache;
    perform a binary search on the cache;

after the binary search is performed, identifying a first index and a second index of a region; and remove the region from the cache based on the first index and the second index of the region.

15. A non-transitory computer program product for managing a cache, the computer program product comprising instructions for:

receiving a region to be stored within the cache, the cache comprising a plurality of regions, and each of the regions being defined by memory ranges having a starting index and an ending index; and storing, by a processor, the region that has been received in the cache in accordance with a cache invariant, the cache invariant guaranteeing that at any given point in time the regions in the cache are stored in a given order and none of the regions are completely contained within any other of the regions, wherein the storing comprises storing the region in the cache based on an index value of an immediately preceding region in the cache and based on an index value of an immediately following region in the cache.

16. The computer program product of claim 15, wherein the instructions for storing the region that has been received comprise instructions for storing the region that has been received such that a value of a first index associated with the region that has been received is greater than a value of a first index associated with the immediately preceding region in the cache and such that a value of a second index associated with the region that has been received is smaller than a value of a second index associated with the immediately following region in the cache.

17. The computer program product of claim 15, further comprising instructions for:

receiving a request for an operation to be performed on the cache; and performing a binary search based on a criteria and an assumption of cache state that is guaranteed by the cache invariant.

18. The computer program product of claim 15, further comprising instructions for:

receiving a request for a region to be inserted into the cache;

performing a first binary search on the cache;

after performing the first binary search, determining a position of insertion into the cache based on a value of a first index associated with the region to be inserted;

performing a second binary search on the cache;

after performing the second binary search, determining a last region in the cache that is contained within the region to be inserted based on a value of a second index associated with the region to be inserted;

inserting the region to be inserted into the cache at the position of insertion; and removing all of the regions in the cache between the value of the first index associated with the region and the last region.

19. The computer program product of claim 15, further comprising instructions for:

determining that at least a first region in the cache partially overlaps with a second of the regions in the cache; and combining the first region with the second region so as to create a single region in the cache.

20. The computer program product of claim 15, further comprising instructions for:

receiving a request for a region to be removed from the cache;

performing a binary search on the cache;

after performing the binary search, identifying a first index and a second index of a region; and removing the region from the cache based on the first index and the second index of the region.

* * * * *